(12) United States Patent
Uehara et al.

(10) Patent No.: US 8,393,380 B2
(45) Date of Patent: Mar. 12, 2013

(54) ROLL-UP SHADE APPARATUS FOR A VEHICLE

(75) Inventors: Tatsuaki Uehara, Sakura (JP); Yoshikazu Ikeda, Sakura (JP); Hisanori Fukuda, Sakura (JP)

(73) Assignee: Yachiyo Industry Co., Ltd., Sayama-shi (JP)

( * ) Notice: Subject to any disclaimer, the term of this patent is extended or adjusted under 35 U.S.C. 154(b) by 68 days.

(21) Appl. No.: 13/071,571

(22) Filed: Mar. 25, 2011

(65) Prior Publication Data

US 2011/0232851 A1    Sep. 29, 2011

(30) Foreign Application Priority Data

Mar. 26, 2010    (JP) .................................. 2010-71500

(51) Int. Cl.
*B60J 1/20*    (2006.01)

(52) U.S. Cl. .................... 160/370.22; 160/313; 160/318; 296/97.8

(58) Field of Classification Search ............. 160/370.22, 160/313, 265, 318, 274; 296/97.8, 219
See application file for complete search history.

(56) References Cited

U.S. PATENT DOCUMENTS 4,139,231 A * 2/1979 Lang et al. ................. 296/37.16
4,887,660 A * 12/1989 Kraus ........................... 160/265
8,281,847 B2 * 10/2012 Uehara et al. ............ 160/370.22

FOREIGN PATENT DOCUMENTS

JP    2003-214073 A    7/2003

* cited by examiner

*Primary Examiner* — Blair M. Johnson
(74) *Attorney, Agent, or Firm* — Squire Sanders (US) LLP

(57) ABSTRACT

The present invention provides a roll-up shade apparatus for a vehicle with enhanced assemblability. This roll-up shade apparatus includes a shade that opens and closes an internal opened part of a roof; a retractor that rolls up the shade from a base-end thereof; second wire drums disposed in coaxial with the retractor, a wire being wound around each of the second wire drums that winds up or feeds the wire together with an opening/closing of the shade; elastic members that engage the retractor with the second wire drums. The retractor includes a pipe retractor and cap retractors in a cylindrical shape each having a bottom, which are fit inside the pipe retractor, and each of the elastic members is installed inside the cap retractor in such a manner that one end of the elastic member is engaged with one of the second wire drums and the other end of the elastic member is engaged with the bottom of the cap retractor, and each of the cap retractors locked to each opening end portion of the pipe retractor so as to rotate together with the pipe retractor.

2 Claims, 5 Drawing Sheets

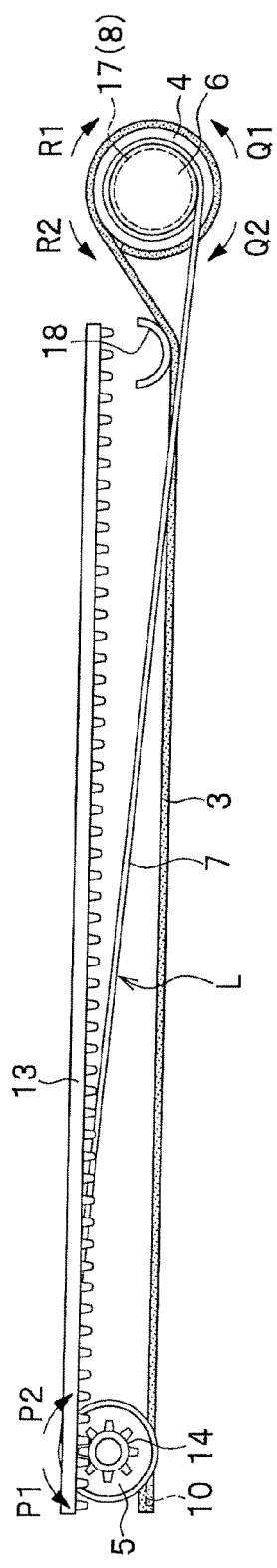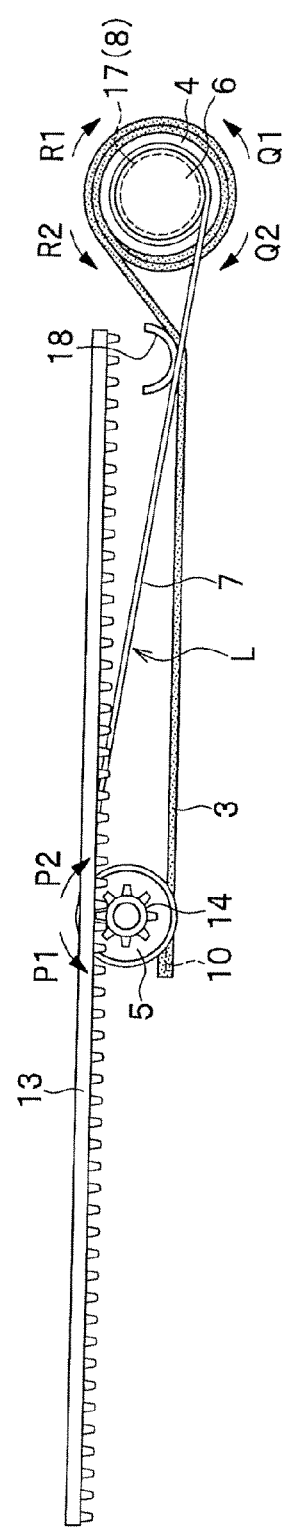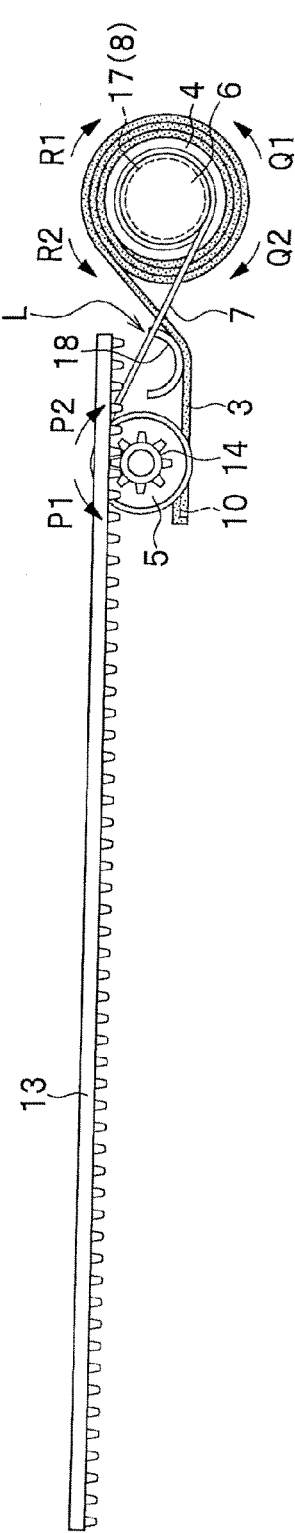
FIG.5A
FIG.5B
FIG.5C

ROLL-UP SHADE APPARATUS FOR A VEHICLE

CROSS-REFERENCE TO RELATED APPLICATION

This application claims the foreign priority benefit under 35 U.S.C. §119 of Japanese Patent Application No. 2010-71500 filed on Mar. 26, 2010, the disclosure of which is incorporated herein by reference.

BACKGROUND OF THE INVENTION

1. Field of the Invention

The present invention relates to a roll-up shade apparatus attached to an internal opened part of a roof of a vehicle.

2. Description of the Related Art

JP 2003-214073 A (see FIG. 3, etc.) discloses a roll-up shade apparatus attached to an internal opened part in a roof of a vehicle, for example. This roll-up shade apparatus includes a sheet-like shade, a cylindrical retractor that winds up the shade, a spring housed in the retractor, a connection shaft extending through the inside of the spring and a frame-structured body that supports the connection shaft. At one end of the spring is engaged with the connection shaft and the other end of the spring is engaged with a hook hole formed in the retractor.

When assembling a conventional roll-up shade apparatus, one end of the spring is engaged with the connection shaft, and then the connection shaft and the spring are inserted through the retractor, but it is very difficult to perform, inside the retractor, a hooking operation to hook the other end of the spring in the hook hole of the retractor. Specifically, the conventional roll-up shade apparatus has a difficulty that the assemblability is poor.

The present invention has been made in order to address the above difficulty and has an object to provide a roll-up shade apparatus for a vehicle with excellent assemblability.

SUMMARY OF THE INVENTION

In order to address the above difficulty, the present invention provides a roll-up shade apparatus for a vehicle includes a shade that opens and closes an internal opened part of a roof; a retractor that rolls up the shade from a base-end thereof; wire drums disposed in coaxial with the retractor, a wire being wound around each of the wire drums that winds up or feeds the wire together with an opening/closing of the shade; elastic members engaged with the retractor and the wire drums, and the elastic members rotatingly urge the retractor in the shade wind-up direction and the elastic members rotatingly urge the wire drums in the wire wind-up direction, so that a rotational force of the retractor is transmitted to the wire drums and rotational forces of the wire drums are transmitted to the retractor in a mutually way through the elastic members. The retractor includes a pipe retractor and cap retractors in a cylindrical shape each having a bottom, which are fit inside the pipe retractor, each of the elastic members is installed inside the cap retractor in such a manner that one end of the elastic member is engaged with one of the wire drums and the other end of the elastic member is engaged with the bottom of the cap retractor, and each of the cap retractors locked to each opening end portion of the pipe retractor so as to rotate together with the pipe retractor.

According to such a configuration, the engagement operation of the elastic members can be performed through the respective cap retractors. Specifically, simply by housing the elastic members inside the cap retractors and locking the cap retractors to the opening end portions of the pipe retractor so as to rotate together with the pipe retractor, it is possible to easily perform the engagement operation of the elastic members relative to the retractor. Accordingly, it is possible to enhance the assemblability of the roll-up shade apparatus.

The wire drums may be preferably pushed and supported to the holder by compression force of the elastic members.

In such a configuration, it is possible to easily perform the assembling operation of the wire drums with the elastic force of the elastic members.

Other features and advantages of the present invention will become more apparent from the following detailed description of the invention when taken in conjunction with the accompanying exemplary drawings.

BRIEF DESCRIPTION OF THE DRAWINGS

FIG. 5A is a side elevation view of the roll-up shade apparatus according to the embodiment of the present invention, showing a fully opened condition of a shade.

FIG. 5B a side elevation view of the roll-up shade apparatus according to the embodiment of the present invention, showing a half-opened condition of the shade.

FIG. 5C a side elevation view of the roll-up shade apparatus according to the embodiment of the present invention, showing a fully closed condition of the shade.

DETAILED DESCRIPTION OF THE PREFERRED EMBODIMENTS

Figure 1:
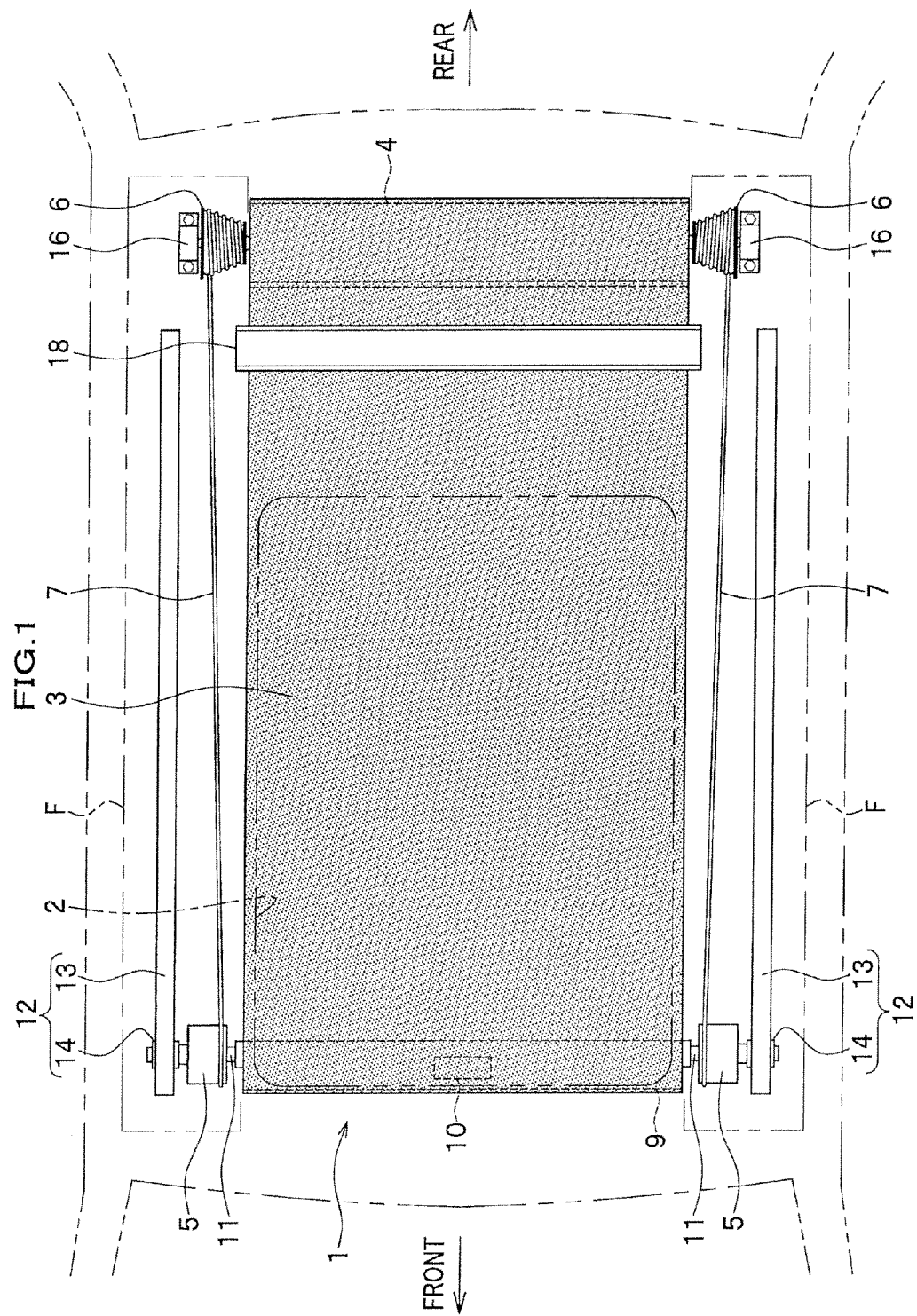
FIG. 1 is a plan view of the roll-up shade apparatus according to an embodiment of the present invention.

As shown in FIG. 1, a roll-up shade apparatus 1 of this embodiment is an apparatus for daylighting/shading at an internal opened part 2 formed in a roof of a vehicle, more specifically, in a ceiling of a vehicle compartment. This roll-up shade apparatus 1 includes a shade 3 that opens/closes the internal opened part 2, and a retractor 4 that rolls up the shade 3 from its base-end (rear-end). In general, a glass panel or glass panels and the like of a sliding roof apparatus are attached above the roll-up shade apparatus 1, but such panels are omitted in the drawings.

The structure of the shade 3 is not limited to any particular one, but as a basic layer structure of the shade 3, it is general that a basal layer is sandwiched between skin layers. Needless to say, the shade 3 is so formed as to be a thin cloth having a flexibility that permits the shade 3 to be rolled up by the retractor 4 even though the multilayered structure is employed. Examples of the skin layer may include synthetic fibers, natural fibers, and leathers, and examples of the basal layer include fiber materials, synthetic resins, and a mixture of fibers with synthetic resins.

Figure 2:
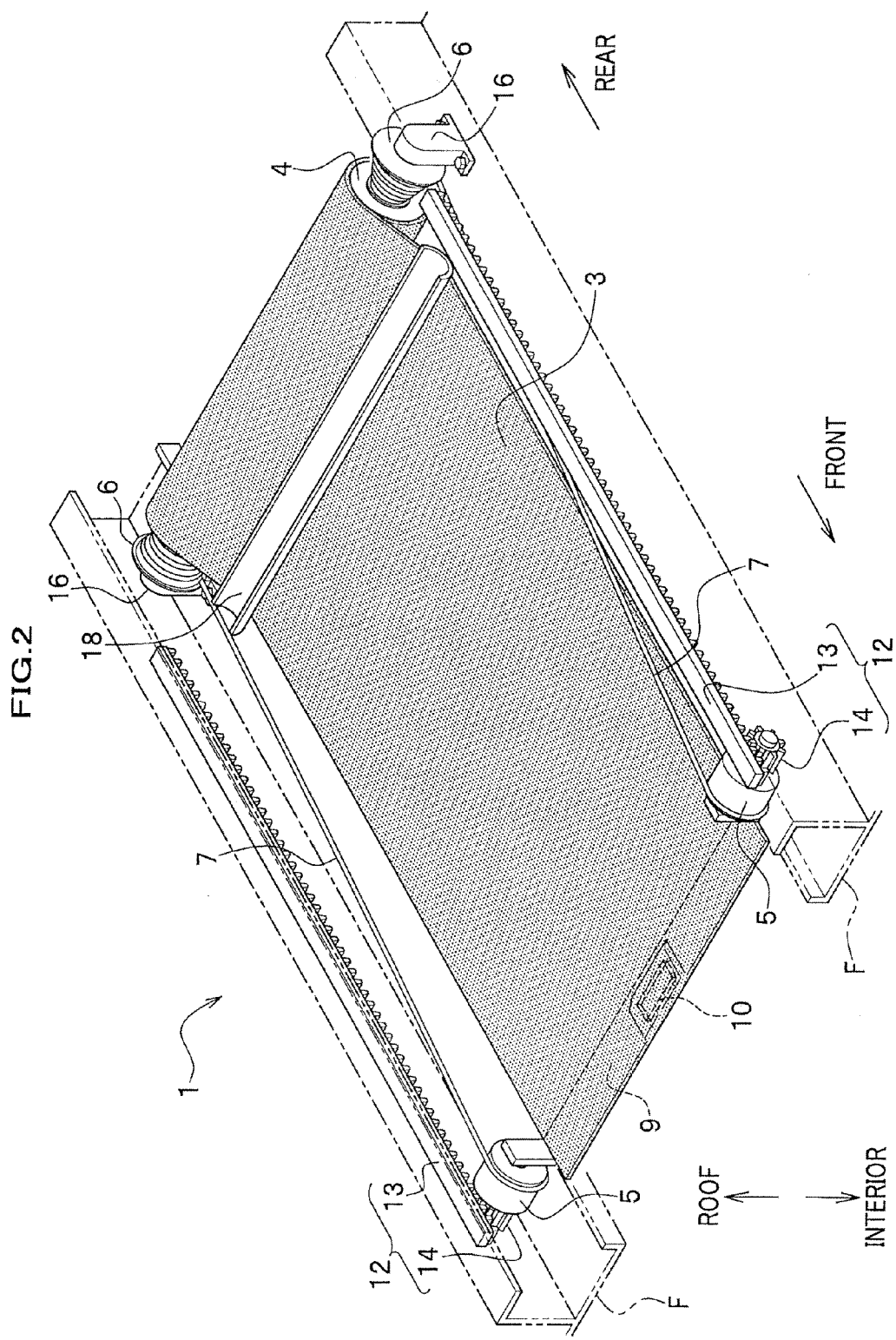
FIG. 2 is an external appearance perspective view of the roll-up shade apparatus according to the embodiment of the present invention.

The retractor 4 in a cylindrical shape is rotatably arranged rearwardly of the internal opened part 2 with an axial direction of the retractor 4 being aligned with a vehicle width direction. The retractor 4 has a circumference surface where the base end of the shade 3 is attached. As shown in FIG. 2, provided ahead of the retractor 4 is a shade holding member 18 which is in contact with and holds an upper face of the shade 3 so as to change its extending direction from a horizontal direction to an inclined direction that is substantially parallel to the tangent line of the retractor 4.

In FIG. 1 and FIG. 2, a reference symbol F stands for a guide frame which is so provided as to extend along each side of the internal opened part 2 and which is fixed to a body frame (not shown). Each guide frame F has a function of, for example, guiding a slide shoe (not shown) of the shade 3 and a slide shoe (not shown) of the glass panel of the sliding roof apparatus, and may be formed of an extruded aluminum alloy, for example. In this embodiment, the guide frame F is used as a fixing member for a rack gear 13, a holder 16, etc., which are discussed later.

Figure 3:
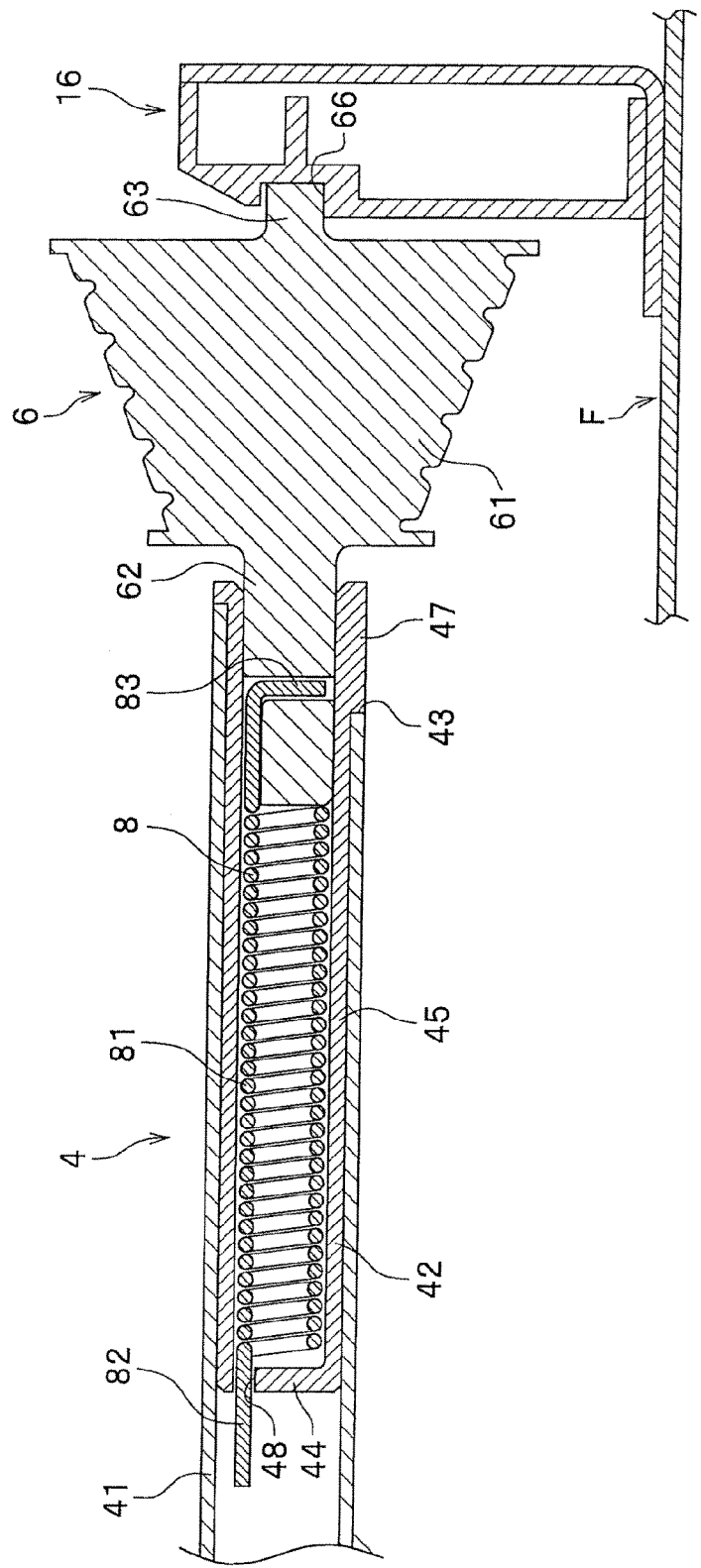
FIG. 3 is a cross sectional view showing internal structures of a retractor and other components in vicinity of the retractor.
Figure 4:
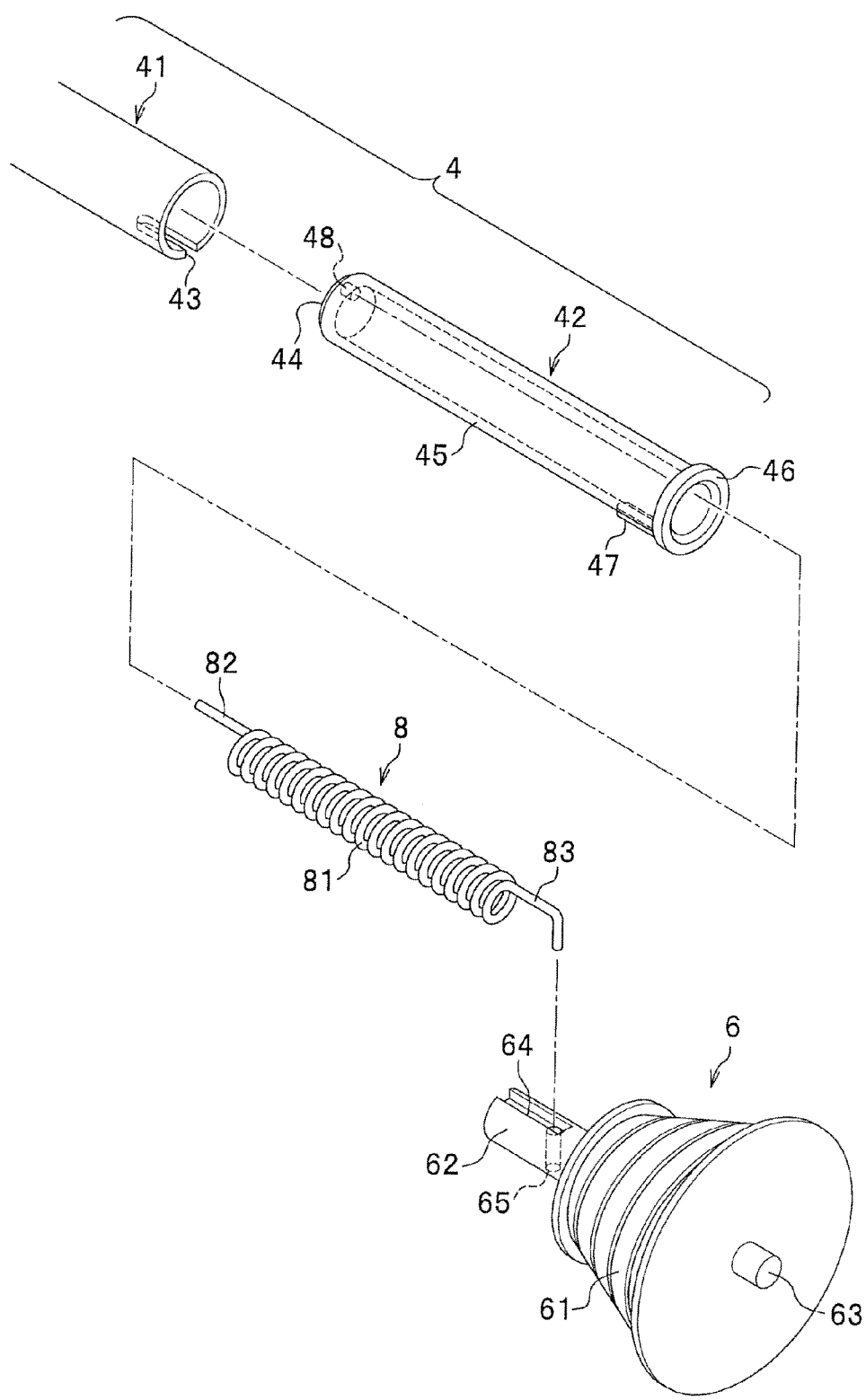
FIG. 4 is a perspective view of the retractor, elastic members and second wire drums according to the embodiment of the present invention.

In FIG. 1 to FIG. 5C, the roll-up shade apparatus 1 of this embodiment has first wire drums 5 which are rotatably provided at respective sides of the leading end of the shade 3, and which move together with the movement of the shade 3 while rotating in a wire wind-up direction (a direction P1) when receiving manual operative force in the open direction of the shade 3 and in a wire feed direction (a direction P2) when receiving manual operative force in the closing direction of the shade 3. The roll-up shade apparatus 1 also has second wire drums 6 which are so coupled to the retractor 4 as to be rotatable together with the retractor 4, such that the wire drums 6 are attached at respective sides of the retractor 4 to be coaxial with the retractor 4 so as to rotate in such a way that a wire wind-up direction (a direction Q1) of the wire drums 6 becomes opposite to a shade wind-up direction (a direction R1) of the retractor 4. The roll-up shade apparatus 1 further has wires 7 which are suspended between a set of the wire drum 5 and the wire drum 6 (on the right side of the vehicle, for example) and between another set of the wire drum 5 and the wire drum 6 (on the left side of the vehicle, for example) respectively, in such a way that the second wire drums 6 rotate in a wire feed direction (a direction Q2) or in the wire wind-up direction (the direction Q1), respectively when the first wire drums 5 rotate in the wire wind-up direction (the direction P1) or in the wire feed direction (the direction P2). In this embodiment, as shown in FIG. 3 and FIG. 4, elastic members 8 are provided between the retractor 4 and the second wire drums 6, and the elastic members 8 rotatingly urge the retractor 4 in the shade wind-up direction (the direction R1) and rotatingly urge the second wire drums 6 in the wire wind-up direction (the direction Q1), so that a rotational force of the retractor 4 is transmitted to the second wire drums 6 and respective rotational forces of the second wire drums 6 are transmitted to the retractor 4 in a mutually way through the elastic members 8.

Specific descriptions will be provided on each component hereinafter. Since the roll-up shade apparatus 1 is configured to be bilaterally symmetric, components in pairs will be described using an example of a structure only those on the left relative to a driver of the vehicle.

A stay 9 made of a rigid body is provided to extend across the leading end of the shade 3 in the vehicle width direction. A handle 10 such as a recessed pull is provided at the lower face (see the arrowed "INTERIOR" side of FIG. 2) of the stay 9. Support shafts 11 are protrudingly provided at both ends of the stay 9 with an axial direction in the vehicle width direction, and the first wire drums 5 are rotatably attached to respective support shafts 11.

As shown in FIG. 3 and FIG. 4, the retractor 4 includes a pipe retractor 41 and cap retractors 42 that are fit inside this pipe retractor 41. The pipe retractor 41 is a metal member in a cylindrical shape. The shade 3 is rolled up around an outer circumferential face of the pipe retractor 41. There is provided at one end of the pipe retractor 41 a cut-out portion 43 that is cut out in the axial direction from the opening of the pipe retractor 41. Not specifically shown in the drawings, a pair of the cap retractors 42 are provided at both opening end portions of the pipe retractor 41.

As shown in FIG. 3 and FIG. 4, each of the cap retractor 42 is a resin or metal member in a cylindrical shape with a bottom. The length of the cap retractor 42 is not limited to particular one, but the length of the cap retractor 42 may be one fourth the length of the pipe retractor 41 in this embodiment, for example. The cap retractor 42 includes a bottom portion 44, a cylindrical portion 45 vertically extending from the bottom portion 44, a locking portion 47 formed on the outer circumferential face of the cylindrical portion 45 so as to extend from a rib 46 toward the bottom portion 44. A through hole 48 is formed through the bottom portion 44.

The outer diameters of the bottom portion 44 and the cylindrical portion 45 are so formed as to be approximately equal to the inner diameter of the pipe retractor 41. The outer diameter of the rib 46 is so formed as to be approximately equal to the outer diameter of the pipe retractor 41. The locking portion 47 is locked to the cut-out portion 43 of the pipe retractor 41. An insertion portion 82 of an elastic member 8 described later is inserted through the through hole 48.

Shapes of the cut-out portion 43, the rib 46 and the locking portion 47 are not limited to particular ones. Other shapes thereof may be applicable if the pipe retractor 41 and each of cap retractor 42 are so engaged with each other as to rotate synchronously.

As shown in FIG. 1 and FIG. 2, the first wire drums 5 are a member in a cylindrical shape, and are provided at both lateral ends of the stay 9. Each of the first wire drums 5 works as a member that winds up or feeds the wire 7 together with the movement of the stay 9. When an occupant reaches the handle 10 and manually opens/closes the shade 3, the first wire drums 5 move back and forth together with the movement of the shade 3. At this time, it is necessary to cause the first wire drums 5 to rotate so that there would be no difference between the travel distance and the rotation distance by sliding or the like. Accordingly, as a conversion mechanism 12 which converts manual operative force to the shade 3 into rotational force of the first wire drums 5, provided in this embodiment is a rack-and-pinion mechanism including rack gears 13 that are extendingly provided in the open/closed direction of the shade 3 and pinion gears 14 which mesh with respective rack gears 13 and which rotate together with the respective first wire drums 5.

The rack gear 13 is attached to the guide frame F in such a way that a gear portion is directed downwardly, for example. The pinion gear 14 is coaxially provided at the external side of the first wire drum 5. Accordingly, as the shade 3 opens/closes, the pinion gears 14 rotates without any sliding in accordance with the backward/forward travel of the shade 3, and a rotational distance of each first wire drum 5 in accordance with opening/closing distance of the shade 3 can be secured. Note that the pinion gear 14 has a pitch diameter that is equal to or smaller than a diameter of a wire winding portion of the first wire drum 5.

The wires 7 are suspended between the wire drums 5 and 6 on the respective sets, so as to apply tension therebetween, enabling the second wire drums 6 to rotate in the wire feed direction (the direction Q2) or in the wire wind-up direction (the direction Q1) when the first wire drums 5 rotate in the wire wind-up direction (the direction P1) or in the wire feed direction (the direction P2), respectively, as explained above. As shown in FIG. 5A, when each of the first wire drums 5 is located at the front end of the travel stroke, the longest straight line part L is formed in the wire 7; but when the first wire drum 5 travels toward the rear as shown in FIG. 5B and FIG. 5C and winds up the wire 7, not only the first straight line part L of the wire 7 is wound up by the first wire drum 5 but also the second wire drum 6 rotates in the direction Q2 to feed the wire 7. In this fashion, the first and second wire drums 5, 6 are designed to have respective drum diameters that make the wire wind-up length of the wire 7 larger than the travel distance of the first wire drum 5, i.e., the opening/closing distance of the shade 3.

The second wire drums 6 are provided in pairs at the both lateral ends of the retractor 4 so as to be coaxial with the retractor 4. Each of the second wire drums 6 is a member that feeds or winds up the wire together with the movement of the stay 9. As shown in FIG. 3 and FIG. 4, the second wire drum 6 includes a body 61 in a conical trapezoidal shape, a first shaft 62 projecting from the body 61 in the vehicle inner direction, and a second shaft 63 projecting from the body in the vehicle outer direction.

There is formed a groove where the wire 7 is locked in the outer circumferential face of the body 61. The first shaft 62 is formed in an approximately cylindrical shape and has a diameter a little smaller than that of the cap retractor 42. The first shaft 62 (of the second wire drum 6) rotates relative to the cap retractors 42. There are formed a groove 64 that is cut out in the axial-length direction of the outer circumferential face from the tip end of the first shaft 62 and a hole 65 continuously extending from the groove 64 in the axially radial direction in the first shaft 62. The second shaft 63 is a member in a cylindrical shape that is supported in a recessed portion 66 of the holder 16 as shown in FIG. 3. The holder 16 is fixed to the guide frame F.

In this embodiment, a twisted coil spring is used as the elastic member 8 ("the elastic member" is also referred to as "the twisted coil spring" hereinafter). The twisted coil springs 8 are coupled with the respective cap retractors 42 and the respective second wire drums 6 in a twisted manner. The cap retractor 42 and the twisted coil spring 8 are so disposed as to be coaxial with each other. The length of the twisted coil spring 8 is not limited to a particular one, but it may be set to be one fifth the length of the retractor 4 in this embodiment. The twisted coil spring 8 includes a base portion 81 that is stretchable, an insertion portion 82 extending in the vehicle inner direction from the base portion 81, and an engagement portion 83 extending in the vehicle outer direction from the base portion 81.

The insertion portion 82 is provided in a linear form and is inserted through (engaged with) the through hole 48 of the cap retractor 42. The engagement portion 83 is formed in a hook shape and is engaged with the groove 64 and the hole 65 of the second wire drum 6. When the twisted coil spring 8 and the second wire drum 6 are engaged with each other, the outer circumferential face of the base portion 81 of the twisted coil spring 8 agrees with the outer circumferential face of the first shaft 62 of the second wire drum 6.

The twisted coil spring 8 urges the retractor 4 and the second wire drums 6 in the opposite direction to each other, and as shown in FIG. 5A to FIG. 5C, a rotational moment in the direction R1 that is the wind-up direction of the shade 3 is applied to the retractor 4, and a rotational moment in the direction Q1 that is the wind-up direction of the wire 7 is applied to the second wire drums 6.

Next, descriptions will be provided on how to assemble the retractor 4. As shown in FIG. 4, the engagement portion 83 of the twisted coil spring 8 is engaged with the groove 64 and the hole 65 of the second wire drum 6. While inserting the twisted coil spring 8 inside the cap retractor 42, the insertion portion 82 of the twisted coil spring 8 is inserted through the through hole 48. Then, the locking portion 47 of the cap retractor 42 is locked in the cut-out portion 43 of the pipe retractor 41. As shown in FIG. 3, when mounting the retractor 4 and the second wire drum 6 that are integrally engaged with each other to the holder 16, the second wire drum 6 is pushed into the retractor 4 against the urging force of the twisted coil spring 8 so as to move the second wire drum 6 relative to the retractor 4, and then the second shaft 63 of the second wire drum 6 is inserted into the recessed portion 66 of the holder 16. Thus, the second wire drum 6 is pushed and supported to the holder 16 by compression force of the twisted coil spring 8.

Descriptions will be provided on an effect of the roll-up shade apparatus 1 with the above-described configuration.

<When Opening Shade 3>

From the condition shown in FIG. 5A in which the shade 3 is fully closed, as an occupant puts his/her hand on the handle 10 and pulls the shade 3 backward as shown in FIG. 5B, the first wire drums 5 and the pinion gears 14 travel backward together with the leading end portion of the shade 3, and at this time as the pinion gears 14 meshing with respective rack gears 13 rotate, the first wire drums 5 rotate in the direction P1, and travels backward while winding up the wire 7.

As explained above, because the wind-up length of the wire 7 is set to be larger than the travel distance of the first wire drum 5, in response to the wind-up operation of the first wire drums 5, the respective second wire drums 6 rotate in the direction Q2 so as to feed the respective wires 7. The rotational force of each second wire drum 6 in the direction Q2 is transmitted to the retractor 4 through the twisted coil spring 8. That is, as the second wire drums 6 rotate in the direction Q2, the retractor 4 rotates in the direction R1 while being pulled by the twisted coil spring 8, and winds up the shade 3.

During a period from the condition shown in FIG. 5A to the fully opened condition of the shade shown in FIG. 5C, because of the urging force by the twisted coil spring 8, a rotational moment in the direction Q1 that is a direction to wind up the wire 7 is applied to each second wire drum 6, so that the straight line part L of the wire 7 is always tensioned, and the wire 7 does not sag. Likewise, a rotational moment in the direction R1 that is a direction to wind up the shade 3 is applied to the retractor 4, so that the shade 3 is constantly tensioned, and the shade 3 does not sag.

<When Closing Shade 3>

From a condition shown in FIG. 5C, as the shade 3 is pulled forward, the first wire drums 5 and the pinion gears 14 travel forward together with the leading end portion of the shade 3, and at this time, as the pinion gears 14 meshing with respective rack gears 13 rotate inversely, the first wire drums 5 rotate in the direction P2, and travel forward while feeding respective wires 7.

On the other hand, as the shade 3 is pulled forward, the retractor 4 rotates in the direction R2 so that the shade 3 is fed. The rotational force of the retractor 4 in the direction R2 is transmitted to the second wire drums 6 through the twisted coil spring 8. That is, as the retractor 4 rotates in the direction R2, the second wire drums 6 rotate in the direction Q1 while being pulled by the twisted coil spring 8, and among the wire 7 fed from each first wire drum 5, portions other than a portion forming the straight line part L are wound up.

During a period from the condition shown in FIG. 5C to the condition shown in FIG. 5A, because of the urging force by the twisted coil spring 8, a rotational moment in the direction Q1 that is a direction to wind up the wire 7 is applied to each second wire drum 6, so that the straight line part L of the wire 7 is constantly tensioned, and the wire 7 does not sag. Likewise, a rotational moment in the direction R1 that is a direction to wind up the shade 3 is applied to the retractor 4, so that the shade 3 is constantly tensioned, and the shade 3 does not sag.

As explained above, according to the roll-up shade apparatus 1 of the present invention, the cap retractors 42 are provided so that it is possible to readily perform an operation of fixing (engaging) the twisted coil springs 8 into (with) the pipe retractor 41. Specifically, while engaging the engagement portion 83 of the twisted coil spring 8 with the second wire drum 6, the insertion portion 82 of the twisted coil spring 8 is inserted through the through hole 48 of the bottom portion 44 of the cap retractor 42, and then the locking portion 47 of the cap retractor 42 is locked in the cut-out portion 43 of the pipe retractor 41. Accordingly, it is possible to easily perform the operation of fixing (engaging) the twisted coil spring 8 into (with) the retractor 4.

Since the cap retractor 42 is provided with the rib 46 and the locking portion 47, simply inserting the cap retractor 42 into the pipe retractor 41 enables the cap retractor 42 to be locked to the pipe retractor 41 so as to rotate together with each other.

The above-mentioned conventional roll-up shade apparatus applies twisted reaction force equally to the right and the left, so that the spring is required to be disposed in the center of the longitudinal direction of the retractor, which makes an operation of positioning the spring more difficult.

To the contrary, according to this embodiment of the present invention, simply by housing the twisted coil springs 8 inside the cap retractors 42 and locking the cap retractors 42 to the pipe retractor 41, it is possible to position the depth of the twisted coil springs 8 relative to the cap retractor 41. Accordingly, it is possible to facilitate the operation of positioning the twisted coil springs 8. In addition, this embodiment of the present invention provides a pair of the twisted coil springs 8 at the both right and left sides of the retractor 4, which realize a preferably balanced assembly in an easy way.

The length of each twisted coil spring 8 is set to be one fifth the length of the retractor 4. Thus, the length of the spring can be more shortened compared to that of the conventional roll-up shade apparatus, which realizes reduction in cost of components of the roll-up shade apparatus.

When assembling the retractor 4, the elastic force of the twisted coil spring 8 can be used for installing the retractor 4 to the holder 16, which enhances the assemblability. The retractor 4 is easily detachable with the elastic force of the twisted coil spring 8, so as to be preferable for the maintenance operation of the retractor 4.

As the conversion mechanism 12 which converts manual operative force to the shade 3 into rotational force of the first wire drums 5, this embodiment of the present invention provides a rack-and-pinion mechanism including rack gears 13 that are extendingly provided in the open/closed direction of the shade 3 and pinion gears 14 which mesh with respective rack gears 13 and which rotate together with respective first wire drums 5. Accordingly, the first wire drums 5 can be caused to rotate in accordance with the opening/closing distance of the shade with a simple structure.

This embodiment of the present invention has been explained as described above, but various changes and modifications may be made in this embodiment without departing from the spirit and scope of the present invention. For example, the second wire drums 6 are formed in a conical trapezoidal shape in this embodiment, but may also be formed in a cylindrical shape. The length and the arrangement position of the twisted coil spring 8 may be appropriately determined in consideration with the depth of the cap retractor 42 and the length of the first shaft 62 of the second wire drum 6, etc.

Omitting a specific drawing, as for the manner of rolling up the shade 3 and the wires 7 as well as the conversion mechanism 12, another manner thereof may be applicable if the shade 3 can be held at an opening/closing position desired by an occupant, and the shade 3 and the wires 7 do not sag.

According to the present invention, it is possible to enhance assemblability of the roll-up shade apparatus.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A roll-up shade apparatus for a vehicle comprising:
a shade that opens and closes an internal opened part of a roof;
a retractor that rolls up the shade from a base-end thereof;
wire drums disposed in coaxial with the retractor, a wire being wound around each of the wire drums that winds up or feeds the wire together with an opening/closing of the shade;
elastic members engaged with the retractor and the wire drums, the elastic members rotatingly urging the retractor in the shade wind-up direction and the elastic members rotatingly urging the wire drums in the wire wind-up direction, so that a rotational force of the retractor is transmitted to the wire drums and respective rotational forces of the wire drums are transmitted to the retractor in a mutual way through the elastic members,
the retractor comprising a pipe retractor to which the shade is attached and cap retractors each of which is in a cylindrical shape and has a bottom, the cap retractors are fit inside the pipe retractor,
each of the elastic members are installed inside each of the cap retractors in such a manner that one end of the elastic member is engaged with one of the wire drums and the other end of the elastic member is engaged with the bottom of the cap retractor, and
each of the cap retractors locked to each of opening end portions of the pipe retractor so as to rotate together with the pipe retractor.

2. The roll-up shade apparatus for a vehicle as claimed in the claim 1, further comprising holders, wherein
the wire drums are pushed and supported to the respective holders by compression force of the elastic members.

* * * * *